United States Patent [19]

Thomas

[11] Patent Number: 4,519,505
[45] Date of Patent: May 28, 1985

[54] EGG TRANSFER SYSTEM

[75] Inventor: Leslie P. Thomas, Canton, Mich.

[73] Assignee: Diamond Automations, Inc., Framington, Mich.

[21] Appl. No.: 452,451

[22] Filed: Dec. 23, 1982

Related U.S. Application Data

[63] Continuation-in-part of Ser. No. 394,443, Jul. 1, 1982.

[51] Int. Cl.³ .............................................. A01K 43/08
[52] U.S. Cl. .................... 209/513; 198/488; 198/504; 209/917
[58] Field of Search ............... 209/510, 512, 513, 514, 209/911, 917, 918, 592–596, 563–566; 198/488, 504, 505

[56] References Cited

U.S. PATENT DOCUMENTS

| | | |
|---|---|---|
| 1,669,087 | 5/1928 | Hungerford . |
| 2,112,259 | 3/1938 | Wyland ........................... 209/917 X |
| 2,645,344 | 7/1953 | Hayter ............................ 209/917 X |
| 2,648,430 | 8/1953 | Wilson . |
| 2,731,146 | 1/1956 | Page . |
| 2,815,112 | 12/1957 | Engleson et al. . |
| 2,830,531 | 4/1958 | Tarlton . |
| 3,135,386 | 6/1964 | Reading ............................ 209/513 |
| 3,213,999 | 10/1965 | Williams . |
| 3,217,857 | 11/1965 | Ellis et al. . |
| 3,224,610 | 12/1965 | Scollard et al. . |
| 3,295,658 | 1/1967 | Rose et al. . |
| 3,426,894 | 2/1969 | Page . |
| 3,478,862 | 11/1969 | Niederer . |
| 3,504,791 | 4/1970 | Page .................................... 209/513 |
| 3,898,435 | 8/1975 | Pritchard et al. . |
| 3,901,334 | 8/1975 | Rose . |
| 3,928,184 | 12/1975 | Anschutz ........................... 209/513 |
| 4,122,941 | 10/1978 | Giles et al. . |
| 4,149,623 | 4/1979 | Nelson . |
| 4,195,736 | 4/1980 | Loeffler . |
| 4,405,023 | 9/1983 | Guardiola . |

FOREIGN PATENT DOCUMENTS

| | | |
|---|---|---|
| 2508894 | 9/1975 | Fed. Rep. of Germany . |
| 2418758 | 11/1979 | France . |
| 2064144 | 6/1981 | United Kingdom . |

Primary Examiner—Robert B. Reeves
Assistant Examiner—Edward M. Wacyra
Attorney, Agent, or Firm—Kenyon & Kenyon

[57] ABSTRACT

A method and apparatus for advancing eggs from a candling station through a plurality of weighing stations in an egg grading apparatus. The eggs are received from the candling station by elongated guide members and are advanced continuously on the guide members through the weighing stations by advancing bars disposed vertically above the guide members. After weighing, the eggs are advanced to a plurality of holding stations disposed in alignment with and downstream of the guide members and weighing stations. Pairs of eggs are lifted from the holding stations and horizontally adjacent pick-up locations by a rotatable and reciprocal lifting mechanism which rotates about an axis perpendicular to the longitudinal axis of the guide members so as to facilitate engagement and vertically upward lifting of the eggs during upward rotational movement thereof.

41 Claims, 18 Drawing Figures

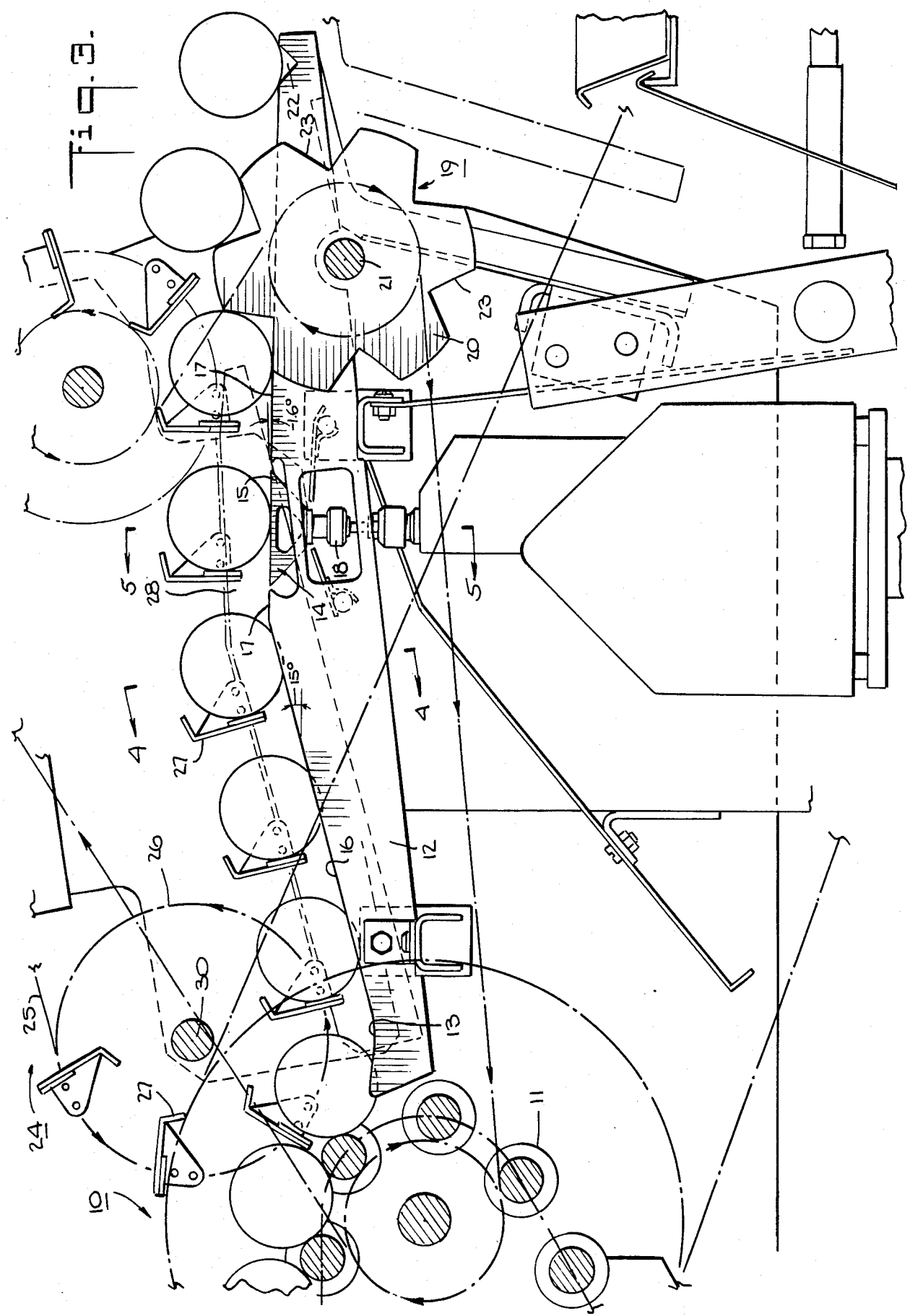

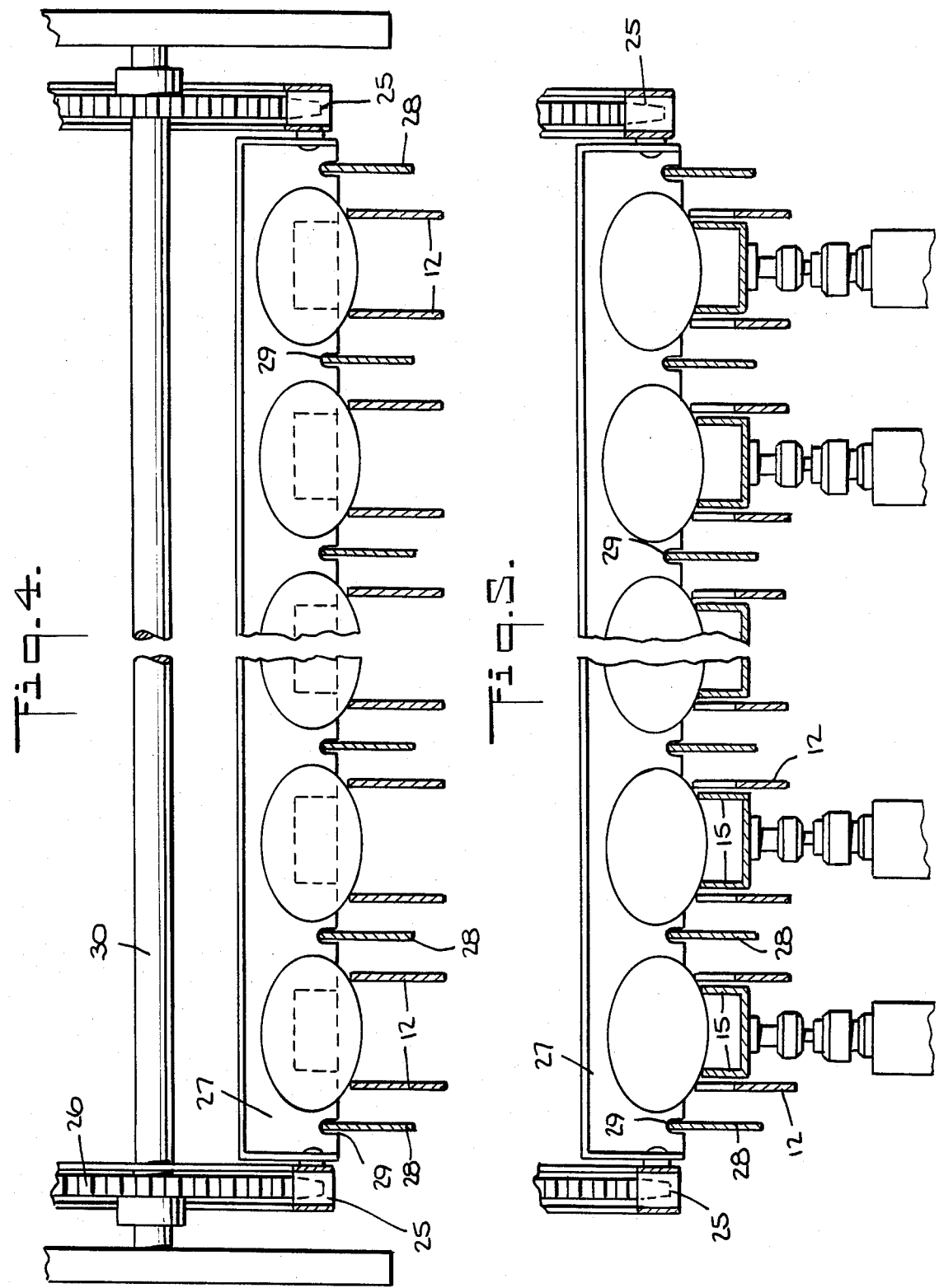

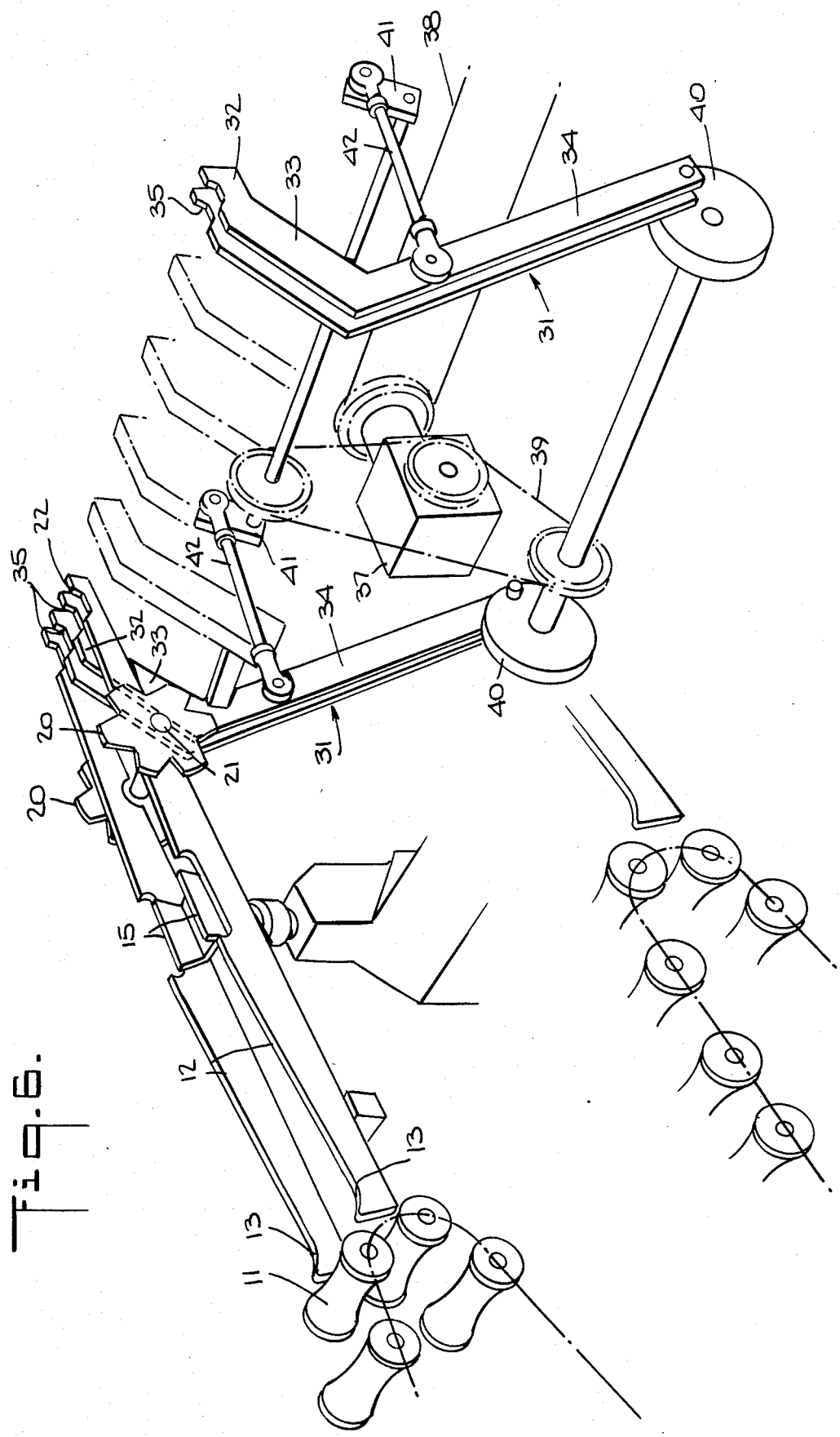

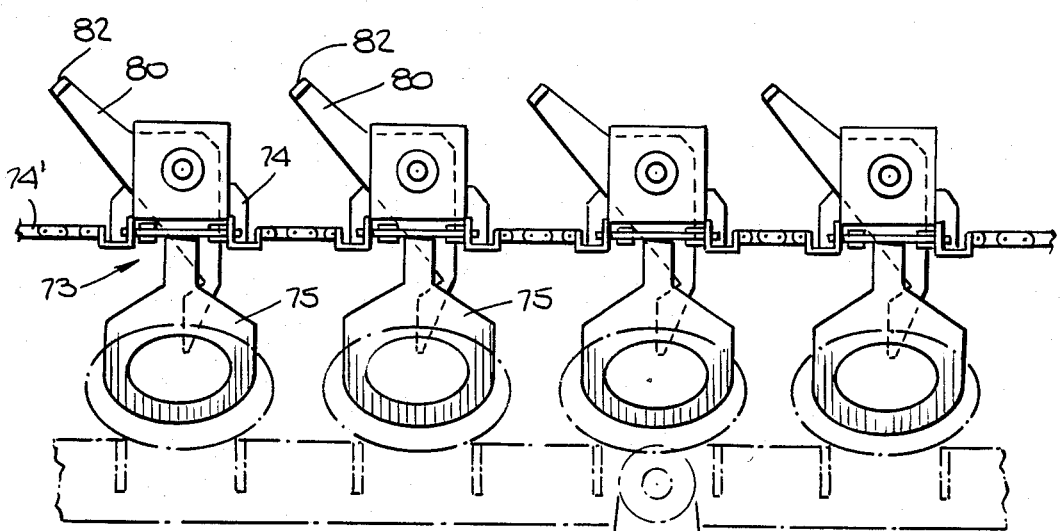
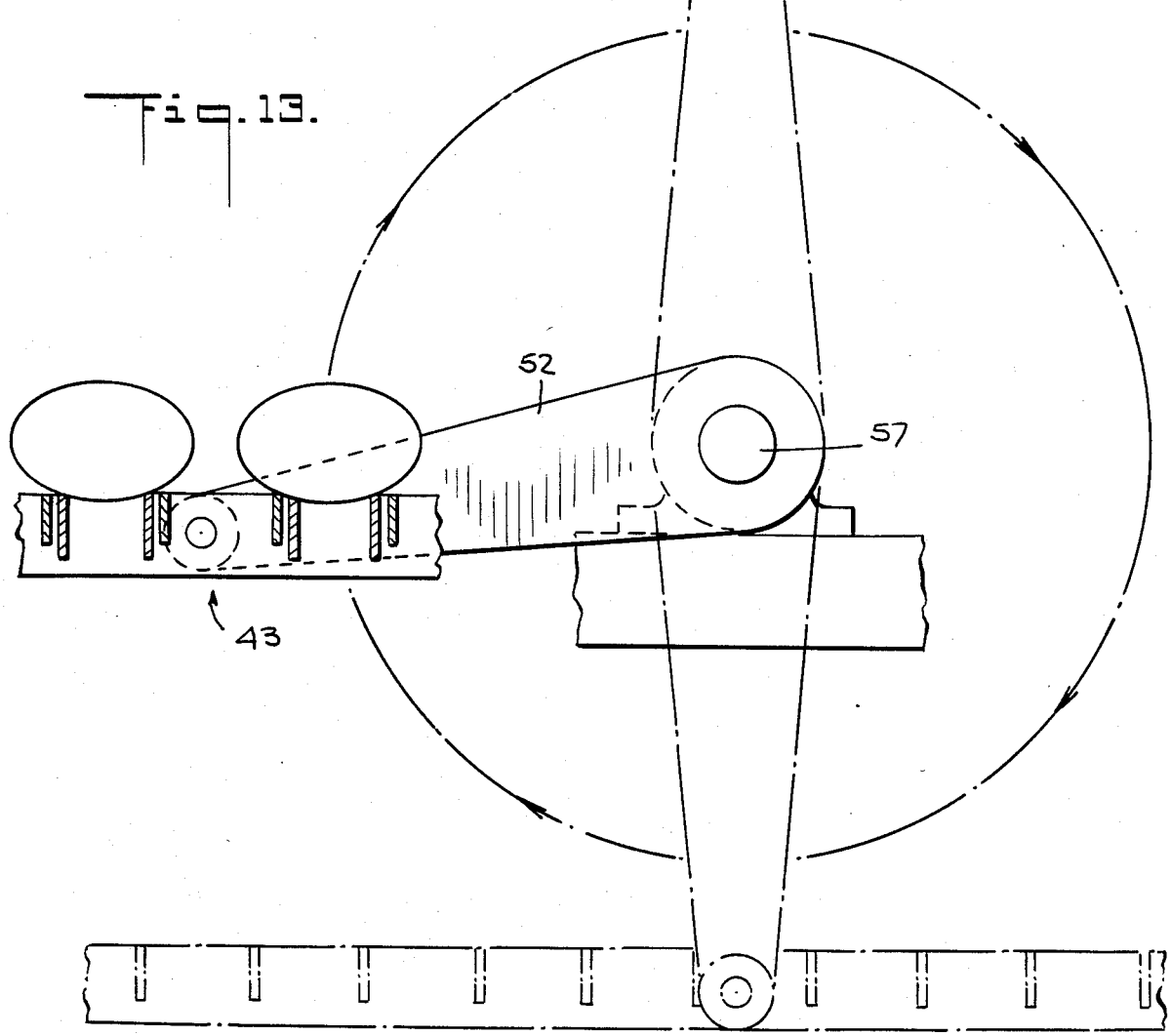
Fig. 13.

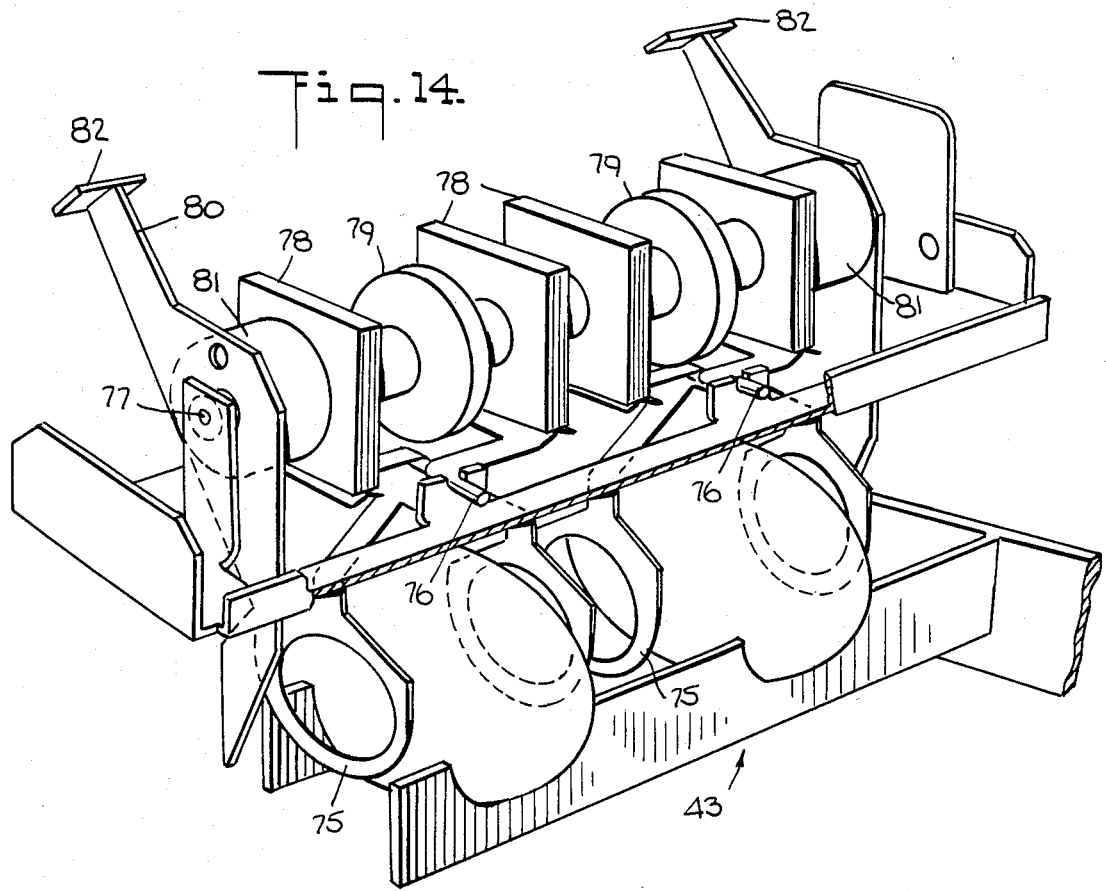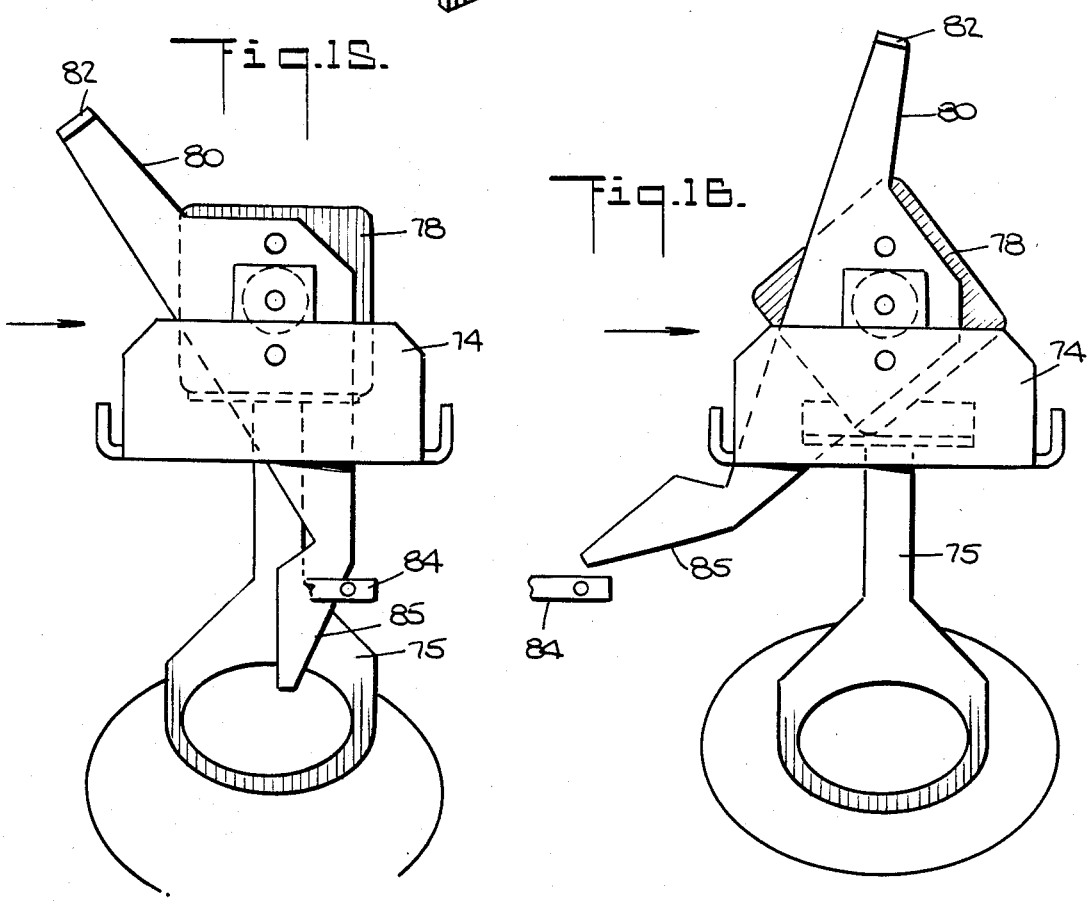

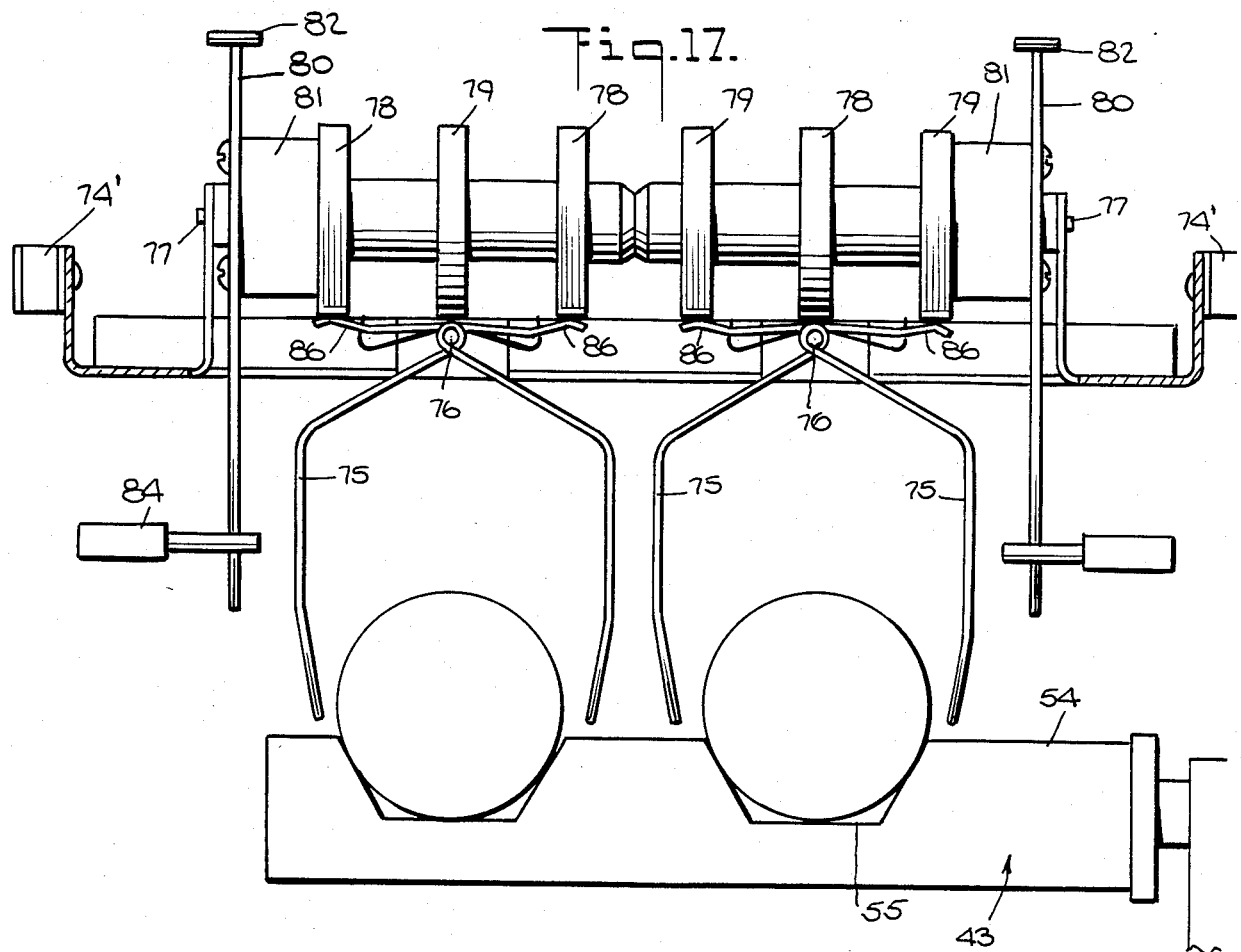
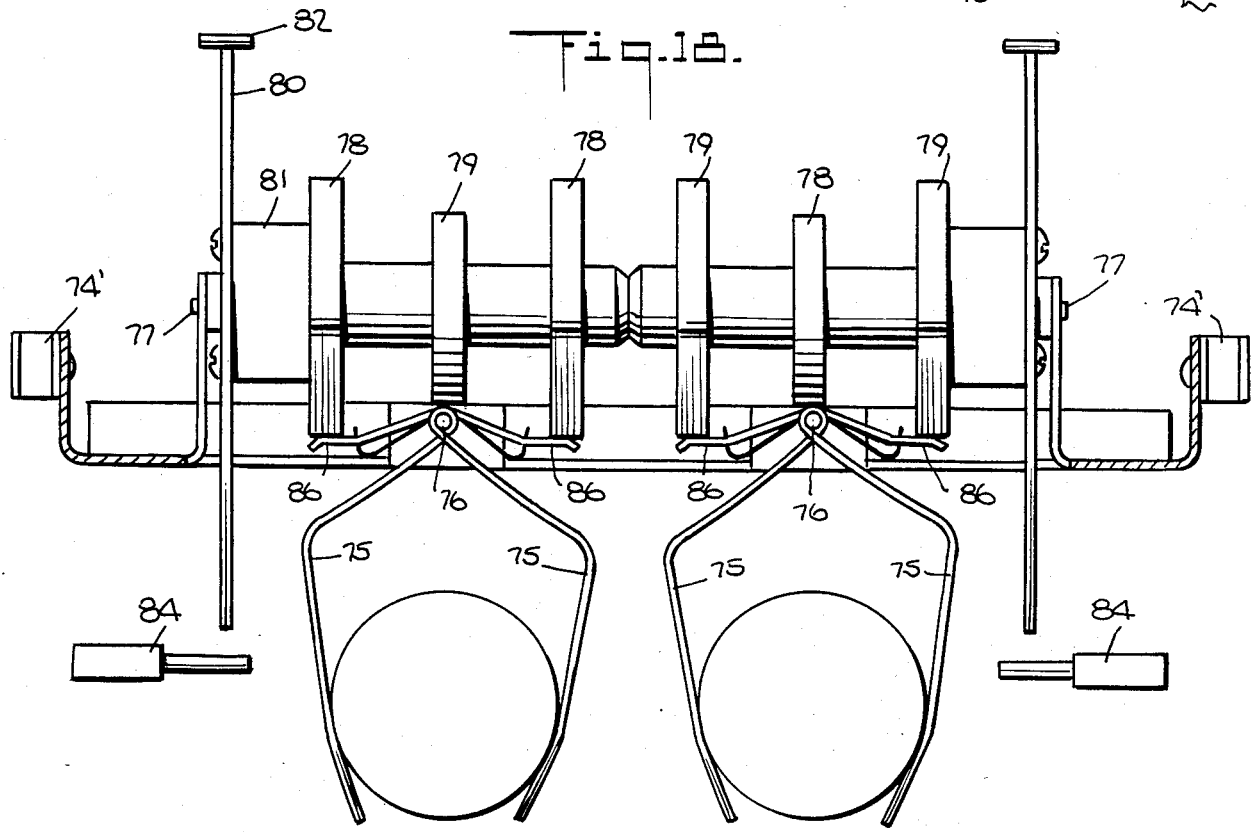

EGG TRANSFER SYSTEM

BACKGROUND OF THE INVENTION

This application is a continuation-in-part of my prior copending application, Ser. No. 394,443, filed July 1, 1982.

1. Field of the Invention

This invention relates generally to an egg transfer system, and in particular to an egg transfer system for advancing eggs from a candling station to a plurality of weighing stations in an egg grading apparatus in which individual eggs are classified in accordance with their physical characteristics including weight. More particularly, this invention relates to an apparatus and method by which the eggs are transferred from the candling station through the weighing stations to a conveying means which delivers the eggs to egg packers disposed downstream thereof.

2. Description of the Prior Art

In the processing of eggs, one important component of the processing system is an egg grader by means of which each of the eggs being processed is classified or graded in accordance with its particular physical characteristics, including its weight and size. Generally, included in the egg grading process is a candling operation by which defects such as blood spots, dirt stains, rough spots, shell cracks or other defects are identified. In addition, as part of the grading process each egg is weighed in order to determine its size for ultimate packing with other eggs of a generally similar weight and size. In this respect the eggs are weighed in order to facilitate packing in accordance with established weight ranges specified by governmental agencies. Eggs are generally classified into designated classifications, dependent on weight, such as small, medium, large and extra large. In addition, classifications such as peewee and jumbo are utilized for those eggs not falling within the aforementioned weight classifications.

In an egg grader performing the above functions, limitations exist for the performance of the machine which in turn dictate the maximum operating speed for an entire automated egg processing system. In order to improve the operating efficiency of such egg processing systems, the speed at which the egg grader of such a system operates must be increased, which requires the system to have a high-speed response time and yet maintain accurate weighing of the respective eggs.

In such egg grading systems, the weighing of the eggs is inherently limited to an individual measurement of each respective egg being processed. Accurate weighing is of the utmost importance since inaccuracies would result in packaging eggs which are below grade and do not conform with government specifications for a respective size, or which are too heavy, which results in improper and uneconomical packaging. Since the weighing function must be conducted on each egg within a finite, allotted period of time, inevitably this operation places increased demands on the system employed to transfer the egg to the weighing stations, as well as the system employed to remove the egg from the weighing stations. Similarly, increased demands in the form of higher operating speeds are placed on the system utilized for transferring or conveying the eggs for further processing.

SUMMARY OF THE INVENTION

It is therefore an object of the present invention to provide an improved egg transfer system which is capable of advancing an egg from one position to another in an egg grading apparatus while operating at a significantly high rate of speed.

It is also an object of the present invention to provide an improved egg transfer system which is adapted to advance an egg through a plurality of weighing stations in a grading apparatus at which the size of each egg being processed is determined.

It is still another object of the present invention to provide an improved egg transfer system for advancing eggs from a candling station to a plurality of weighing stations in a grading apparatus.

It is still a further object of the present invention to provide an egg lifting system adapted to lift a plurality of eggs upwardly and in a direction away from a plurality of holding stations located adjacent to the weighing stations in a grading apparatus.

It is still another object of the present invention to provide an egg lifting system adapted to lift previously-graded eggs upwardly away from the holding stations and to effect the transfer thereof onto a conveyor means.

It is also an object of the present invention to provide a method of advancing eggs through a plurality of weighing stations in a grading apparatus at which eggs are graded according to their respective size.

These and other objects of the invention are achieved in an apparatus for advancing eggs from a candling station through a plurality of weighing stations in an egg grading apparatus, comprising, elogated guide means for receiving eggs from the candling station and guiding the eggs to the weighing stations of the grading apparatus, and first advancing means, disposed vertically above the guide means and adjacent thereto, adapted to individually engage and advance the eggs along the guide means to the weighing stations, the weighing stations being disposed along the guide means so that eggs are advanced over the weighing stations by the advancing means. The apparatus also comprises a plurality of egg holding stations onto which the eggs are advanced by the advancing means, the egg holding stations being disposed in alignment with and downstream of the guide means and the egg weighing stations, and lifting means, adapted to engage a plurality of the eggs from the underside thereof and lift the eggs from the holding stations, the lifting means being rotatably and reciprocally movable with respect to the egg holding stations, the rotational movement of the lifting means being about an axis which is generally perpendicular to the longitudinal axis of the advancing means and the guide means so as to facilitate the engagement and lifting of the eggs by the lifting means during upwardly rotational movement thereof.

The foregoing objects of the invention are also achieved in a method for advancing eggs from a candling station through a plurality of weighing stations in an egg grading apparatus, comprising conveying eggs from the candling station to elongated guide means disposed adjacent to the candling station, continuously advancing the eggs on the guide means through the weighing stations, weighing, simultaneously with the step of advancing, the eggs at the weighing stations, guiding the eggs from the weighing stations to a plurality of egg holding stations, and lifting the eggs from the egg holding stations.

These and other novel features and advantages of the invention wil be described in greater detail in the following detailed description.

BRIEF DESCRIPTION OF THE DRAWING

FIG. 3 is a side view of the egg transfer system;

FIG. 4 is a cross-sectional view of the egg transfer system taken along section 4—4 of FIG. 3;

FIG. 5 is another cross-sectional view of the egg transfer system taken along section 5—5 of FIG. 3;

FIG. 6 is an enlarged perspective view of the egg transfer system;

FIG. 13 is an elevational view, looking from the rear of the grading apparatus, of the egg lifting means and conveyor carriage assemblies of the system of the present invention, illustrating the egg carriage assembly in its open position about to engage the eggs;

FIG. 14 is a perspective view of an egg carriage assembly of the egg grading apparatus, illustrating the holding members of the assembly in an egg-engaging position for receiving the eggs from the egg transfer system;

FIG. 15 is a side elevational view, looking from the rear of the grading apparatus, of the egg carriage assembly, illustrating the assembly in its open or egg-releasing position;

FIG. 16 is another side elevational view, looking from the rear of the grading apparatus, illustrating the egg carriage assembly in its closed or egg-engaging position;

FIG. 17 is a front elevational view of the egg carriage assembly showing it in its open position; and FIG. 18 is another front elevational view of the egg carriage assembly illustrating it in its closed position.

DETAILED DESCRIPTION

Figure 1:
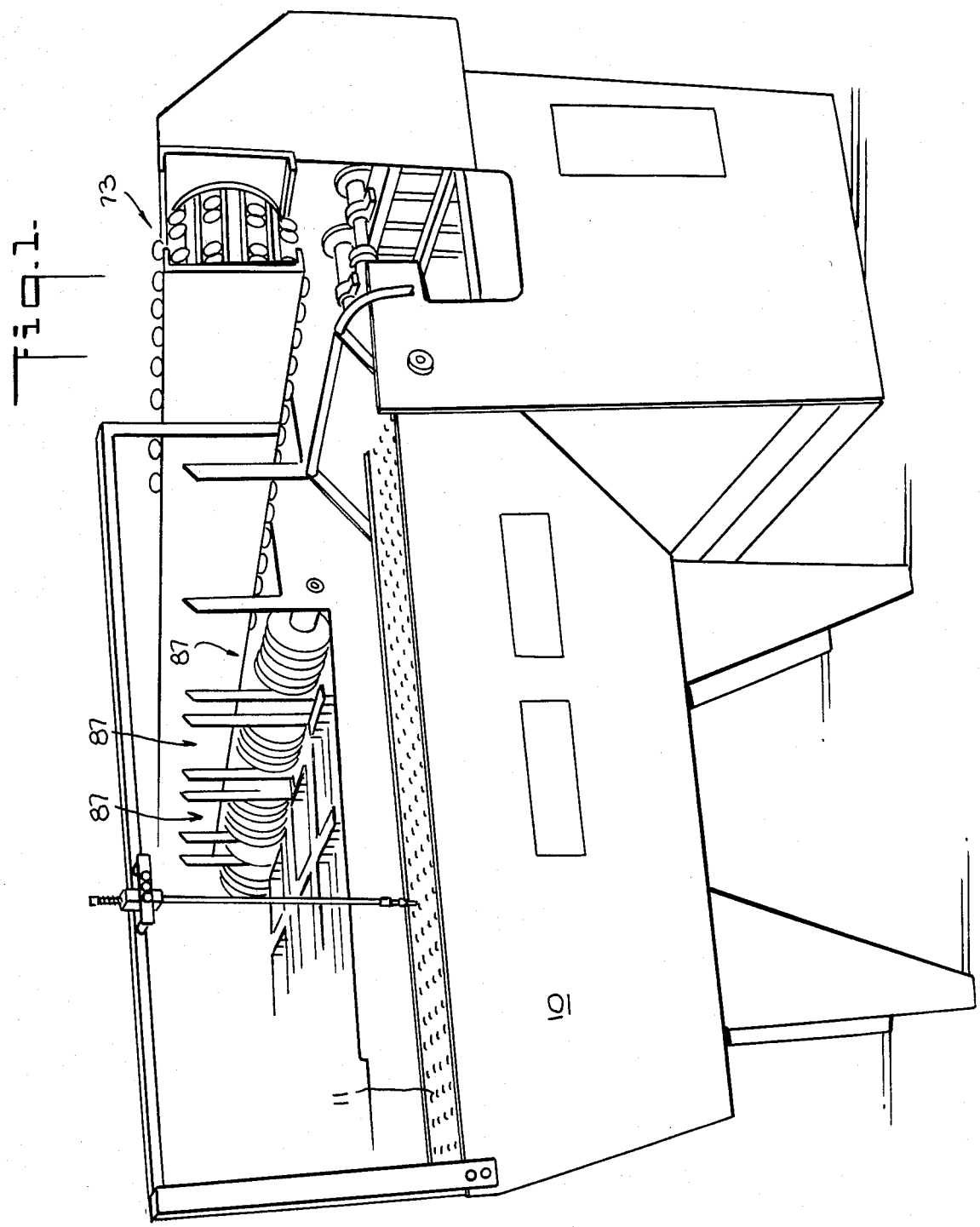
FIG. 1 is a perspective view of an egg grading apparatus utilizing the improved egg transfer system of the present invention.
Figure 2:
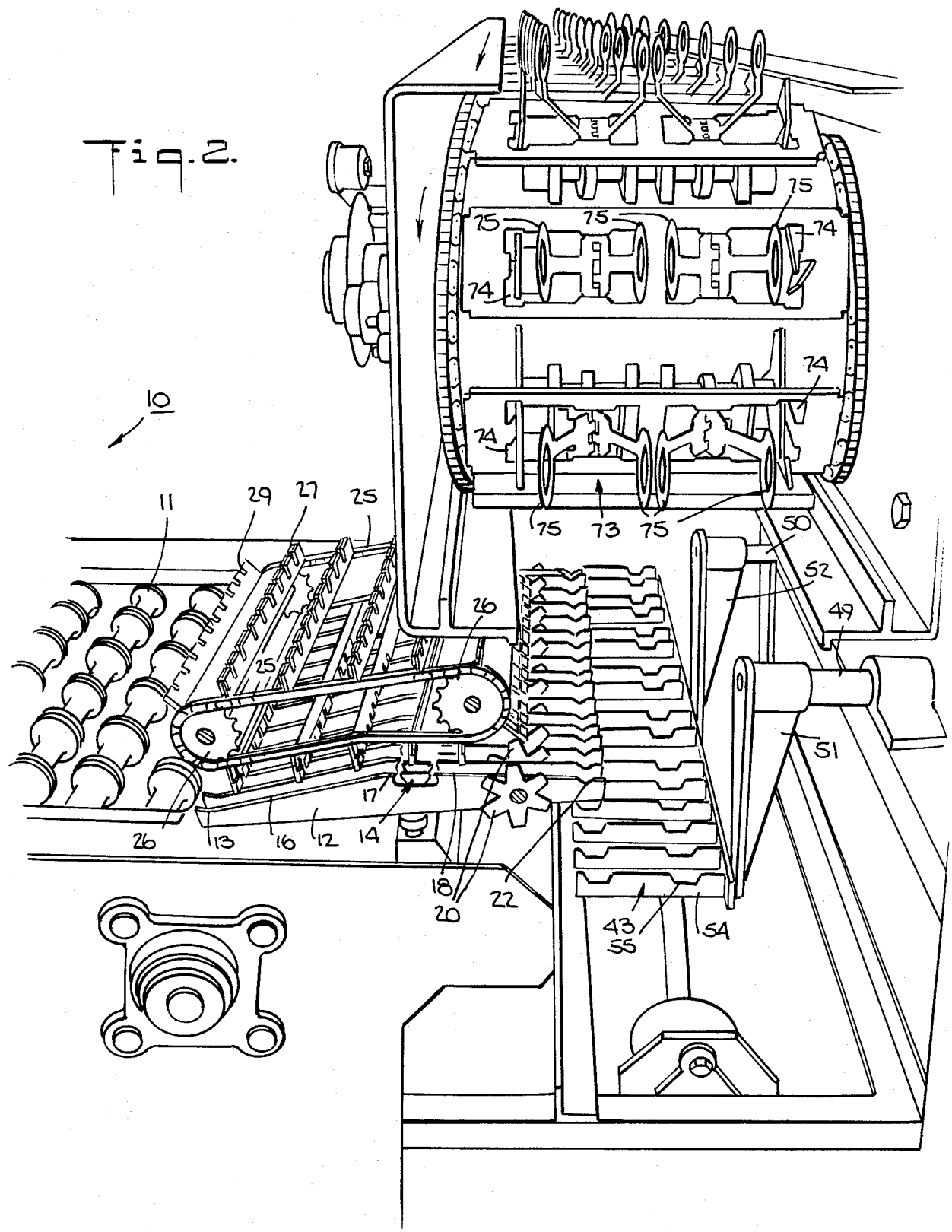
FIG. 2 is a perspective view of the improved egg transfer system of the present invention.

Referring now to the drawings, and in particular to FIGS. 1-5, the egg transfer system of the present invention is described in association with an egg grader, portions of which are disclosed in copending applications entitled "Egg Processing System" and "Egg Handling System", Ser. Nos. 394,162 and 394,161, respectively, filed on July 1, 1982. In the grader, eggs are first routed through an egg candling station 10 at which any defective eggs, e.g., those having cracks, blood spots or the like, are identified. This system is more specifically described in the copending application Ser. No. 394,444, entitled "Article Coding and Separating System" filed July 1, 1982, the disclosure of which is incorporated herein by reference. At the candling station, an operator visually inspects the eggs which are passed over a high-intensity light. As more fully described in application Ser. No. 394,444, each defective egg is identified by the operator and the information is processed and stored in a memory system for later separation of the eggs.

The inspected eggs are conveyed through the candling station 10 by rotating spools 11 of a spool bar conveyor and are fed onto the ends of a plurality of elongated guide bars 12. Each guide bar 12 is formed by a pair of spaced-apart, vertically disposed plate members having substantially horizontal leading edges including curved recesses 13 at the end closest to the candling station in which the egg, after passing through candling station 10, is received. The eggs are gravity fed from candling station 10 by the rotating spools into the recesses 13 at the ends of the guide bars. A series of six guide bars are disposed adjacent one another in the grader, such that six eggs may be fed simultaneously from candling station 10 and advanced through a plurality of weighing stations 14 provided in the grader. After weighing, delivery is accomplished to a conveyor by the simultaneous transfer of twelve eggs as described later herein. Of course, other multiples of the guide bars may be provided in accordance with the invention.

Located downstream of guide bars 12 are the weighing stations 14. Each weighing station includes a pair of vertically disposed, spaced-apart separate plate members 15 similar to those of guide bars 12 which are adapted to hold an egg and are disposed between the plate members which form the guide bars laterally adjacent apertures 88 provided in each of the plate members so that each egg is supported only by plate members 15, and not guide bars 12, at the weighing stations. Each weighing station also includes a scale member 18 which supports members 15 and is movable in a vertical direction and serves to determine accurately the weight of each egg as it is positioned thereon. The weight of each egg as determined at the weighing stations may then be stored in a memory system, as is more fully described in application Ser. No. 394,444.

The guide bars 12 each include at least one first portion 16 located between recesses 13 and weighing stations 14 which is inclined upwardly in the direction of movement of the eggs toward the weighing stations at an angle of about 15° with respect to the horizontal. Each guide bar also includes a second portion 17 located downstream of the first porton which begins just before the weighing stations and is inclined downwardly at an angle of about 1.6° with respect to the horizontal. Both portions are formed by the vertically upper edges of the plate members of the guide bars.

A rotatable star wheel 19 is disposed downstream of the second portion 17 of each guide bar and consists of a pair of spaced-apart disks 20 rotatably mounted on an axle 21 coupled to the drive mechanism of the grading apparatus for rotatably conveying eggs from each of the guide bars to a plurality of egg holding stations 22 located downstream of wheels 19. The disks each include a plurality of peripheral recesses 23 which are disposed in horizontal alignment so as to receive and hold eggs advanced along the guide bars as they are transferred to the holding stations.

The advancing mechanism used to move eggs along the guide bars 12 comprises a chain and sprocket assembly 24 which is disposed vertically above and adjacent guide bars 12. The assembly consists of a pair of chains 25 disposed on sprocket wheels 26 and a plurality of elongated, L-shaped bars 27 mounted on chains 25 transversely with respect to the longitudinal axis of guide bars 12. The sprocket wheels are mounted on axles 30 which are coupled to and driven by the drive mechanism of the grading apparatus. Guide plate members 28 are disposed adjacent the guide bars 12 (see FIGS. 4 and 5) and engage recesses 29 provided in L-shaped bars 27 for guiding bars 27 along an angular horizontal path generally corresponding to the configuration of the upper edges of guide bars 12 formed by first and second portions 16 and 17 as they are advanced by chains 25 and wheels 26. The chain and sprocket assembly is (as shown in FIG. 3) positioned so that as the eggs are conveyed toward the end of the spool bar conveyor and recesses 13 of guide bars 12 from candling station 10, the sprocket wheels of the assembly move bars 27 downwardly and over the rear side of each egg so that bars 27 engage and slidably push each egg into recesses 13 and along the upper edges of guide bars 27 toward weighing stations 14.

The eggs are advanced from the holding stations 22 by means of a drive system illustrated in FIG. 6. The drive system includes an advancing bar 31 comprising an upper horizontal section 32, an inclined intermediate section 33, and a lower section 34, all of which are formed by a pair of spaced-apart vertical plate members which have recesses 35 disposed at their upper ends for holding individual eggs. A main drive motor drives a shaft 36 (see FIG. 7) which in turn is connected to the right angle gear box 37 by a drive chain 38, with an output of gear box 37 driving chain member 39. A pair of oppositely disposed crank members 40 are rotationally driven by chain 39 and are pivotally connected to the lower section 34 of the egg advancing bar 31. Another pair of oppositely disposed crank members 41 are similarly driven by chain 39 and are pivotally connected by way of linkage 42 to the lower section 34 of the egg advancing bar 31. In this manner, the upper horizontal section 32 of the advancing bar is driven in an elliptical or oval path so that the holding stations 22, and a plurality of coplanar egg pick-up positions (described later herein) located adjacent to and horizontally spaced-apart from the holding stations, are disposed along the major axis of the elliptical path.

Figure 7:
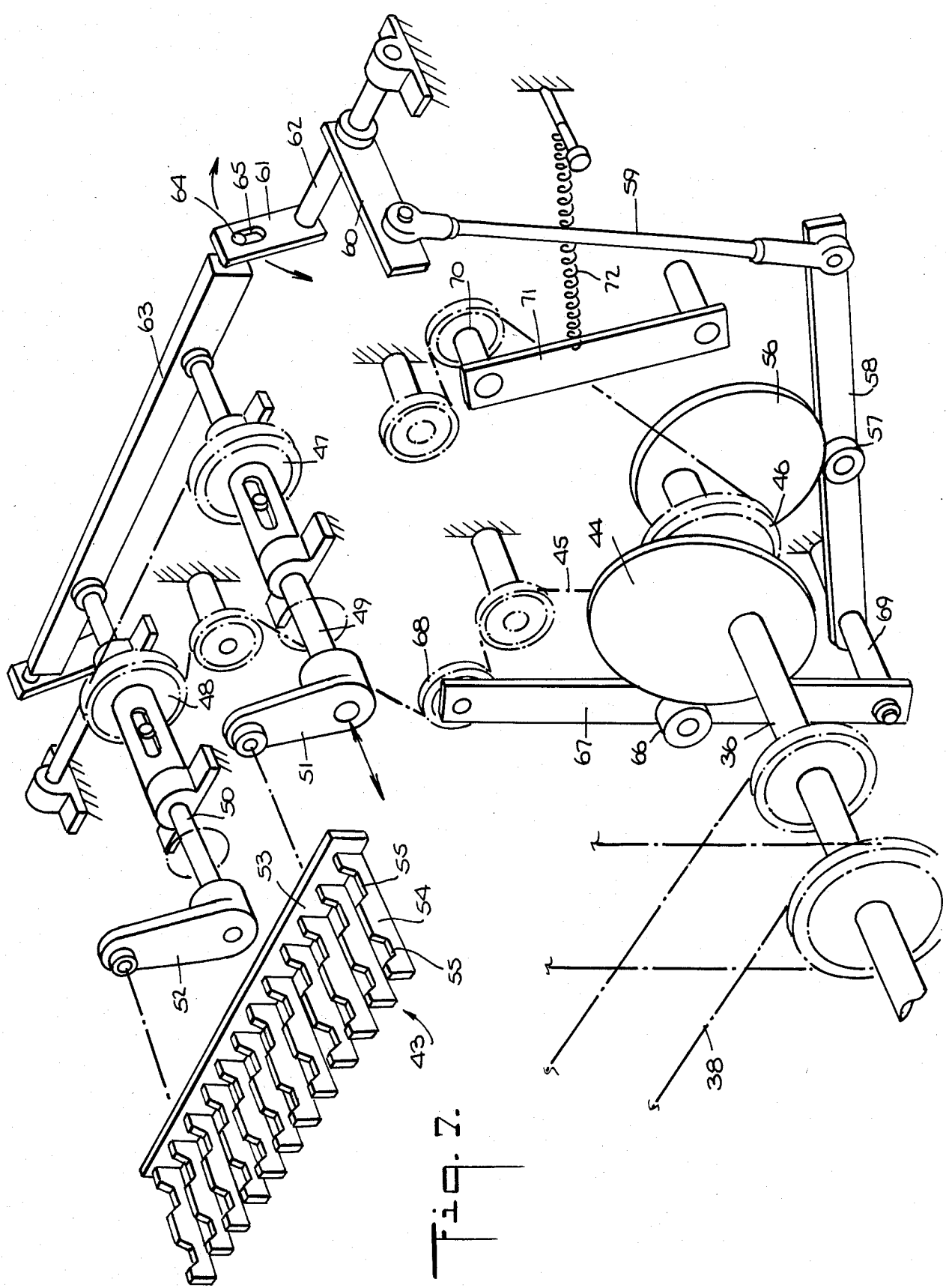
FIG. 7 is a perspective view of the drive system of the egg transfer system of the present invention.
Figure 8:
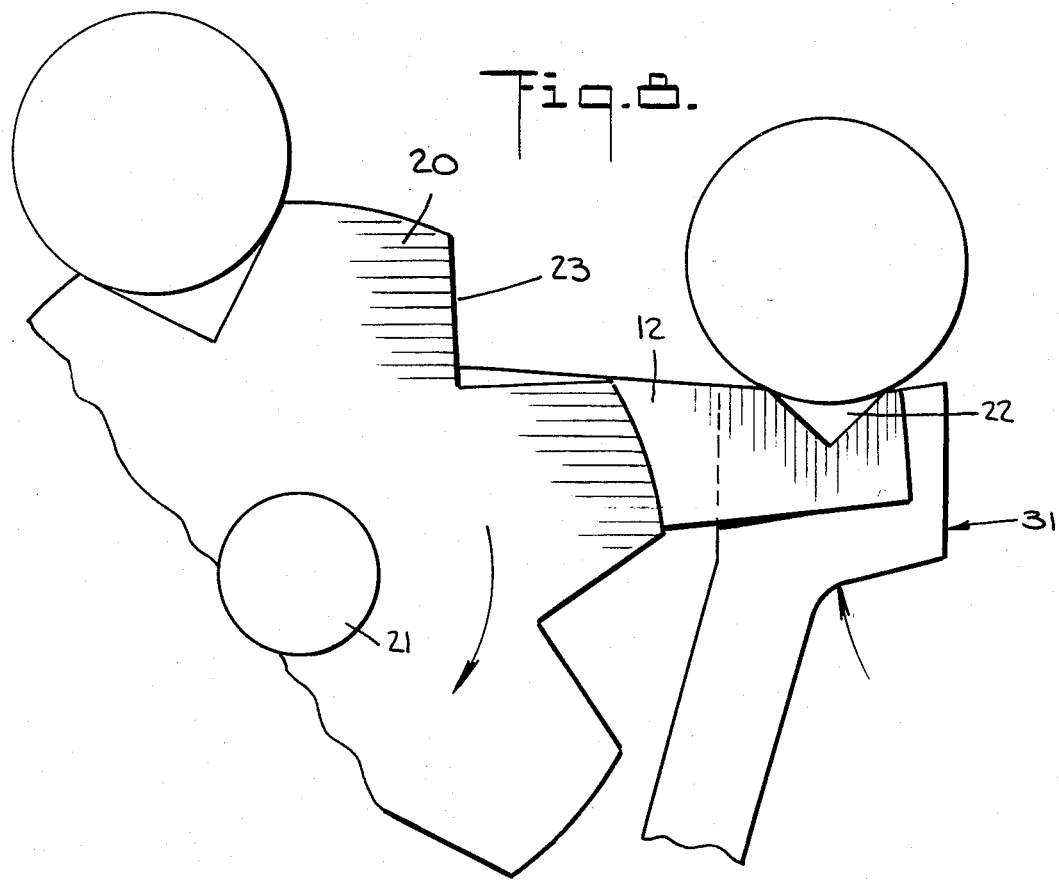
FIG. 8 is an enlarged partial elevational view of the egg transfer system illustrating an egg being advanced away from the egg weighing station to the egg holding station.
Figure 9:
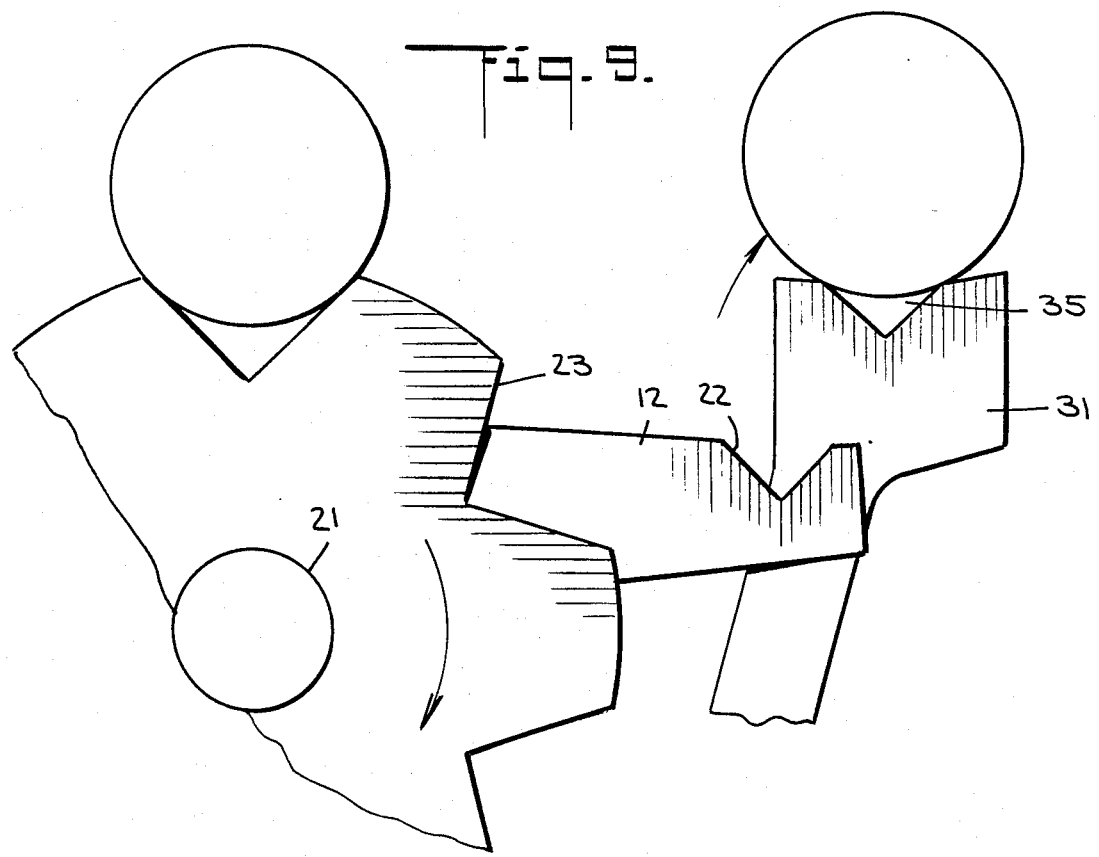
FIG. 9 is an enlarged partial elevational view, similar to that of FIG. 8, illustrating an egg being advanced away from the egg holding station to a horizontally adjacent holding position.
Figure 10:
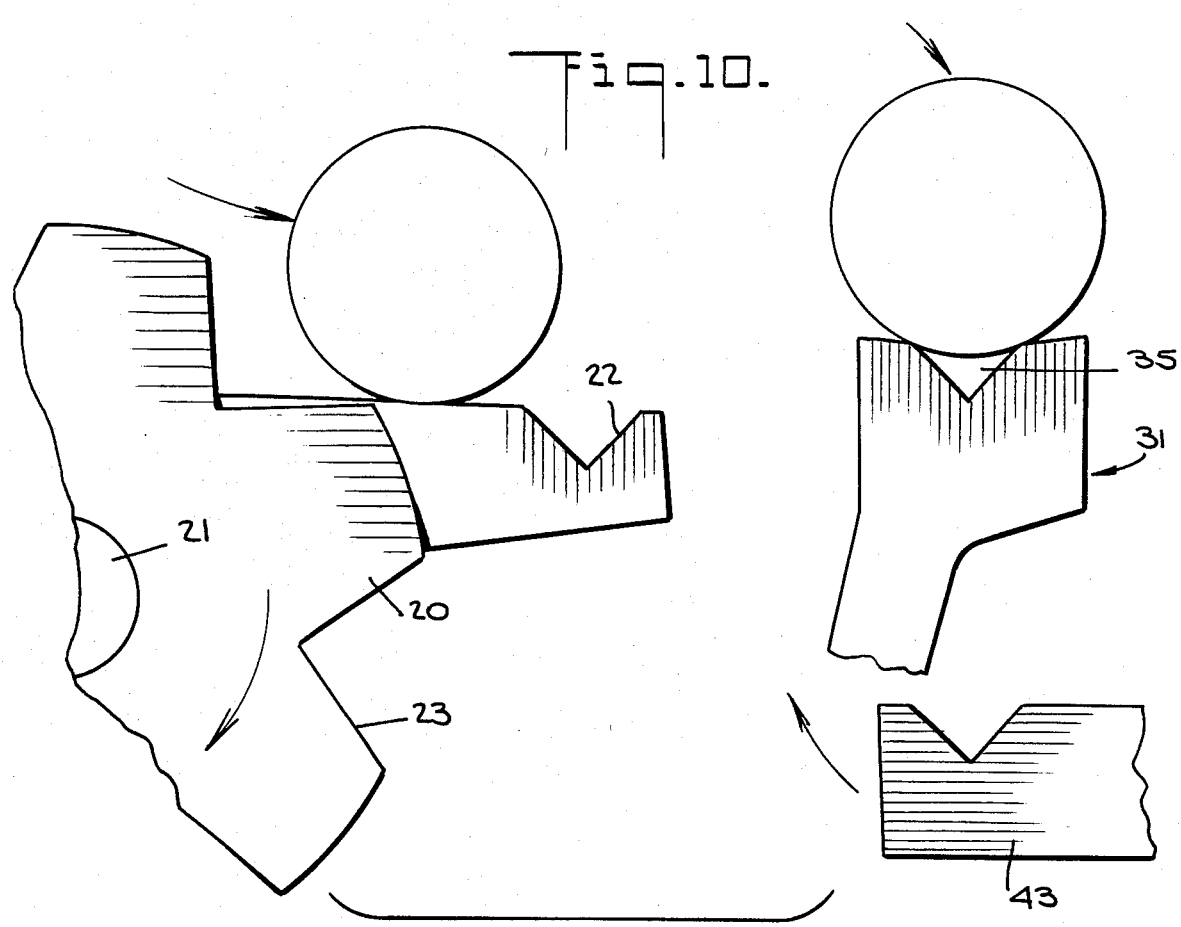
FIG. 10 is an enlarged partial elevational view, similar to that of FIG. 8, illustrating an egg being deposited at the holding station as an egg is advanced away from the holding station to the holding position.
Figure 11:
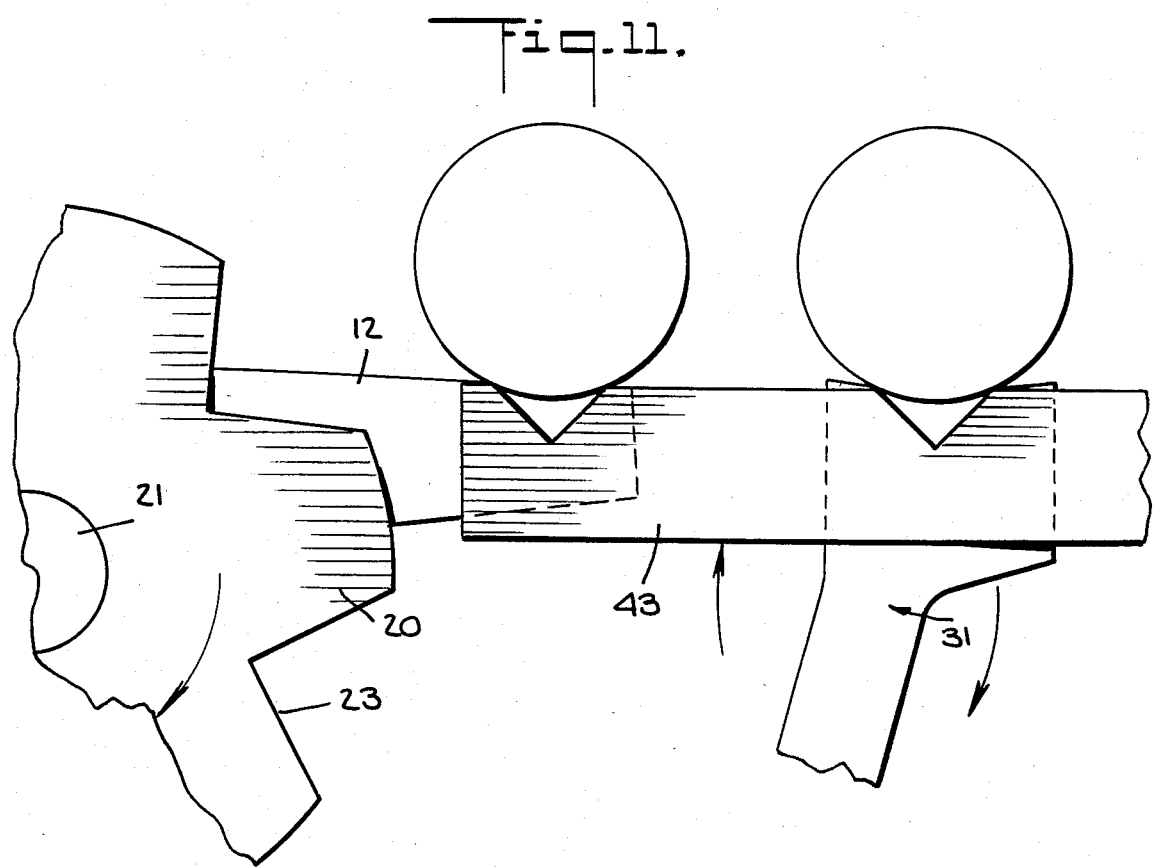
FIG. 11 is an enlarged partial elevational view, similar to that of FIG. 8, illustrating the egg lifting means disposed beneath a pair of eggs located at the holding station and at the holding position.
Figure 12:
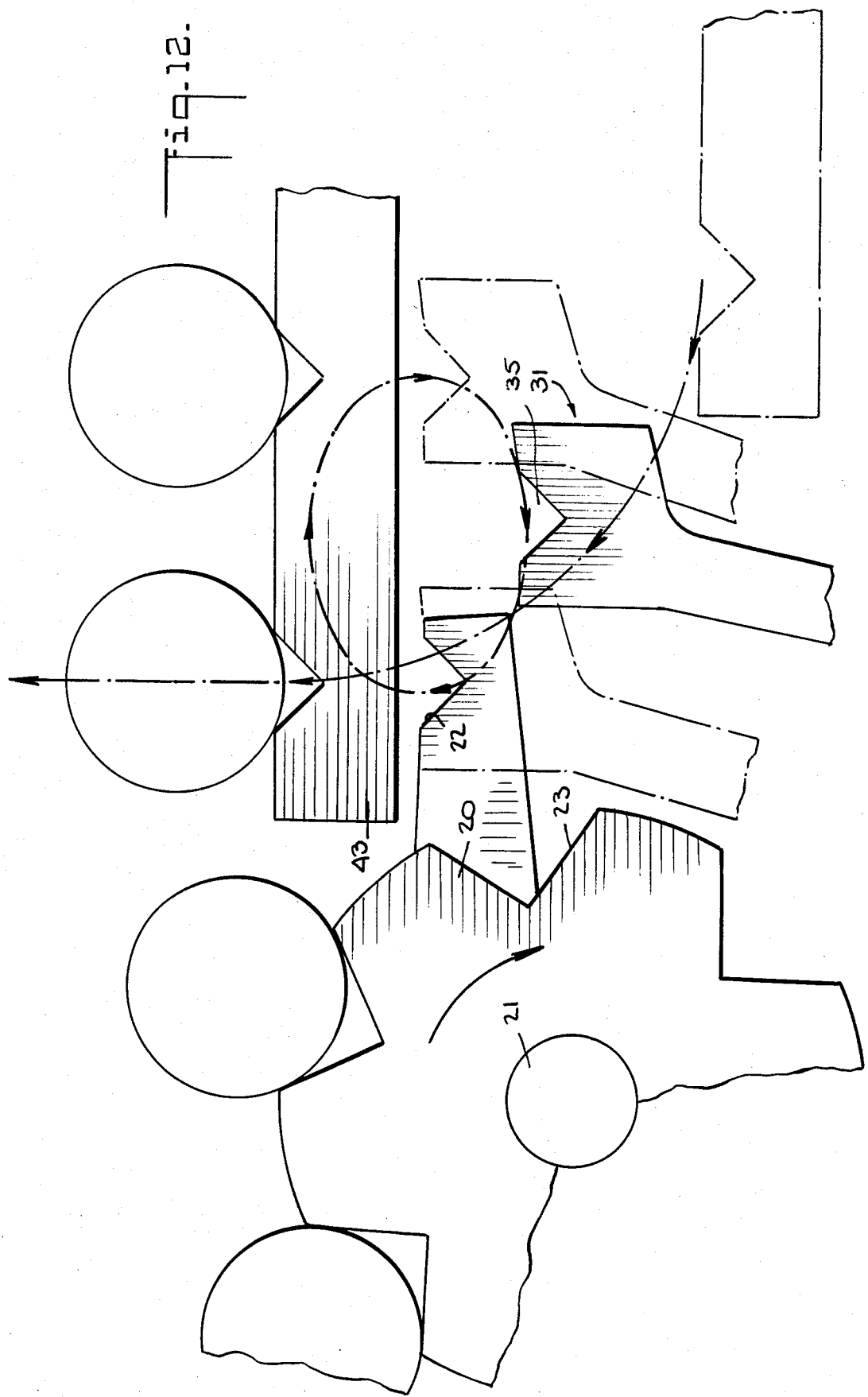
FIG. 12 is an enlarged partial elevational view, similar to that of FIG. 8, illustrating the upward lifting of the pair of eggs from the holding station and the holding position.

With particular reference to FIGS. 7 through 13, the advancement of the eggs from holding stations 22 is described. Eggs are rotatably lifted from the downwardly inclined second portion of guide bars 12 by the wheels 19 and are fed by the wheels into the holding stations 22. Advancing bars 31, and in particular recesses 35 therein, engage the eggs in the holding stations from the underside thereof and lift the eggs upwardly as shown in FIGS. 8 and 9. As each advancing bar is lowered along its elliptical path (FIG. 10), the eggs are moved downwardly into pick-up positions adjacent the holding stations which are horizontally spaced-apart from and coplanar with holding stations 22 as illustrated in FIG. 11. At the same time, a second egg is lifted from the downwardly inclined second portion of each of guide bars 12 and is fed into holding stations 22.

Once two eggs are in position at the holding stations and on the advancing bars 31 in the adjacent pick-up positions, the eggs are lifted vertically upwardly in pairs (FIG. 12) by a plurality of lifting arms 43 each comprising a pair of vertical, spaced-apart plates. Arms 43 move both rotationally with respect to holding stations 22 as well as in a direction longitudinally with respect thereto.

The drive system for lifting arms 43 is illustrated in FIG. 7. A main drive motor is coupled to drive shaft 36, which has mounted thereon a differential speed cam 44 and sprocket drive chains 38 and 45. Chain 38, as previously described, provides the drive for advancing bars 31. Chain 45, which is driven by sprocket 46 in turn serves to drive a pair of differential speed drive sprockets 47 and 48. Each of the sprockets 47 and 48 drives the respective shafts 49 and 50 in a counterclockwise direction, the shafts having mounted on the ends thereof crank arms 51 and 52, respectively. Each rotary crank arm 51 and 52 is fastened to an elongated support bar 53 to which is mounted twelve (12) individual vertical lifting plates 54, each having a pair of recesses 55 for receiving and holding eggs. Each adjacently spaced pair of lifting plates forms a lifting arm 43 and serves to lift a pair of eggs. Support bar 53, thus, facilitates the simultaneous lifting of six pairs or two rows of six side-by-side eggs. In other words, adjacently spaced lifting plates 54 serve to lift simultaneously twelve (12) eggs from the holding stations 22 and adjacent pick-up positions on advancing bars 31.

Cam 56 is mounted at the end of main drive shaft 36 and is engaged with cam follower 57 mounted on the pivotable arm 58 which in turn is connected at the end thereof to connecting linkage 59. Linkage 59 is pivotally connected to the right angle drive arm 60 which in turn drives coupling bar 61 with an oscillating motion about shaft 62. Drive bar 63 is reciprocally driven in a direction toward and away from holding stations 22 by means of coupling bar 63 which is connected thereto via pin 64 slidably mounted in slot 65.

Cam 44 is in rotational engagement with a cam follower 66 mounted on an arm 67 which has mounted at its upper end an idler 68 and at its lower end is pivotally connected by a shaft 69 to pivotable arm 58. Chain 45 is further routed over idler sprocket 70 which in turn is mounted on an idler arm 71 fastened to a spring 72. In this manner, the spring loaded idler arm 71 serves to maintain tension in the drive chain 45 while support bar 53 is driven both rotationally and longitudinally with respect to holding stations 22. Further, differential speed cam 44 serves to regulate the rotational drive speed of lifting arms 43 such that when the arms arrive at the holding stations 22 (when the eggs are being removed therefrom), the rotational speed of the arms is decreased to facilitate the smooth upward lifting of the eggs from the stations.

In this latter connection, reference is made to FIG. 13 in which the rotational movement of crank arm 52 and lifting arms 43 is illustrated. As illustrated, lifting arms 43 engage the eggs from the underside thereof at holding stations 22 and the pick-up positions on advancing bars 31 which are positioned in the rotational path of the arms at approximately the nine o'clock position. Arms 43 are then rotated clockwise and at the twelve o'clock position each of the eggs is brought within the depending arms of an egg carriage assembly 73 which is part of a conveyor driven by a chain 74'. At this position, both the eggs and carriage assembly are travelling at the same speed to properly effect transfer.

Referring to FIGS. 14–15, the carriage assemblies 73 are more fully disclosed in copending application Ser. No. 394,430, entitled "Egg Carrier" filed on July 1, 1982, the disclosure of which is incorporated herein by reference. Briefly, each carriage assembly includes a sheet metal platform 74 which has mounted thereon a pair of depending prongs or egg-engaging members 75. Prongs 75 are pivotally mounted and positioned opposite one another in order to engage an egg therebetween across its smaller side or width. The lower portions of the prongs are curved so as to approximate the curvature across the smaller width of the egg. The upper portions are reversely bent so as to provide a surface having a generally horizontal orientation. The bent portion of each prong is mounted on a fixed shaft 76 so as to be pivotally movable with respect thereto. The opposing prong is similarly mounted over shaft 76 with the free end thereof in engagement with the generally horizontal portion of the other prong.

A mounting shaft 77 is positioned on the platform 74 generally perpendicular with respect to the fixed shafts 76. Cam members 78 have a generally square profile and are pivotally mounted on shaft 77 with the operative bottom flat surfaces thereof being in engagement with the horizontal surfaces of egg-engaging prongs 75. An integral spacer 79 is disposed between adjacent cam members 78 in order to maintain the proper spacing and engagement of the horizontal cam engaging surface with the horizontal surface of the egg-engaging prongs 75. Coupled to each end of cam members 78 is an extension bar 80 which is spaced from the end cam member 78 by integral spacer 81. Bar 80 is provided with an upper T-shaped portion 82 which is engageable with a solenoid-actuated plunger 83 in order to actuate the rotational movement thereof. Each bar 80 is fastened or directly coupled to the adjacent spacer 81, cam 78, intermediate spacer 79 and the adjacent cam 78. In this manner, each pair of egg-engaging prongs 75 is operated independent of one another although mounted to a common shaft 77.

In operation, the eggs are conveyed by the spools 11 from candling station 10 and fed to the leading edges of the guide bars 12. Bars 27 then engage the eggs and slidably advance them into recesses 13 and continuously along the guide bars 12 toward weighing stations 14, at which the weight of each individual egg is measured. During the weighing operation, the eggs are continuously advanced off guide bars 12 at apertures 88 and over plate members 15 supported by the scales of the weighing stations to permit the weighing of each individual egg, and then off plate members 15 and back onto guide bars 12 toward wheels 20, which rotatably convey the eggs to holding stations 22.

Lifting arms 43 rotate about an axis offset from the line formed between the holding stations 22 and the adjacent pick-up positions so that the pairs of eggs disposed at the holding station and in the pick-up positions on the advancing bars are engaged from the underside thereof when the lifting arms reach approximately a nine o'clock position (looking from the rear of the grading apparatus). Arms 43 are moved vertically upwardly from the holding stations and pick-up positions to the carriage assemblies 73 which arrive at a comb assembly 84 with bar 80 in the position depicted in FIG. 15, i.e., in its open or egg-engaging position. Once the eggs are in a position coincident with the approximate center of prongs 75 (approximately the twelve o'clock position), a prong of the comb assembly 84 is positioned in the path of the lower surface 85 of extension bar 80 and, as explained in greater detail in application Ser. No. 394,162, the comb assembly 84 closes or latches prongs 75 on twelve eggs simultaneously so that the prongs engage and securely hold the eggs in the carriage assemblies.

When a prong of comb assembly 75 engages lower surface 85 of extension bar 80, the bar is caused to rotate in a clockwise direction (looking from the rear of the machine) while rotating cam members 78 therewith. Cams 78 are rotated approximately 45° such that the angular or corner portion thereof moves the horizontal surface 86 of the egg-engaging prongs 75 downwardly. The downward movement of the generally horizontal cam-engaging surface 86 causes the lower egg-engaging portion of prongs 75 to move inward with respect to one another and close into an engaging relationship with the egg. In this manner, the egg is thus lifted from lifting arms 43 and conveyed to a packaging position downstream in the grading apparatus.

When bar 80 is pivotally moved into the closed position (FIG. 16), the lower portion thereof engages platform 74 which in turn limits the rotational movement of the bar. After the eggs are received in the carriage assemblies, reciprocating drive bar 63 horizontally moves the lifting arms away from holding stations 22 before the arms are moved downwardly and beneath the next pairs a distance equal to one egg position on the arms so as to avoid any collision between the eggs being removed from the holding stations by the advancing bars and the subsequent eggs being advanced to the pick-up positions.

Once the eggs arrive above the appropriate packer 87 (FIG. 1), a separate actuating means engages the upper T-shaped portions 82 of extension bars 80 causing the same to move in a counter-clockwise direction (looking from the rear of the grading apparatus) thereby releasing the eggs from the carriage assemblies 73. In this respect, a solenoid-activated plunger is moved into the path of the carriage assemblies so that the end thereof engages the T-shaped portions 82 of the extension bars. Thus, counterclockwise rotation of bars 80 from the position depicted in FIG. 16 to that depicted in FIG. 15 causes the prongs 75 to pivot outwardly with respect to one another due to the force exerted by the spring member which urges prongs 75 toward the open or release position.

Thus there has been described an effective system for continuously transferring eggs toward and away from a plurality of weighing stations at which the size characteristics of each eggs are measured. In particular, the system provides for the continuous side-by-side movement of multiple rows of eggs, six in the described embodiment, through a plurality of weighing stations with each egg being advanced individually but in side-by-side relationship. The characteristics of each egg may be measured and stored in a memory system in accordance with which information the eggs are later deposited for packing into designated cartons.

Although the above description is directed to a preferred embodiment of the invention, it is noted that other variations and modifications will be apparent to those skilled in the art, and, therefore, may be made without departing from the spirit and scope of the present disclosure.

What is claimed is:

1. An apparatus for advancing eggs from a candling station through a plurality of weighing stations in an egg grading apparatus, comprising, first elongated guide means for receiving eggs from said candling station and guiding said eggs to the weighing stations of said grading apparatus, first advancing means, disposed vertically above said guide means and adjacent thereto, adapted to individually engage and advance said eggs along said guide means to said weighing stations, said weighing stations being disposed along said guide means so that eggs are advanced over said weighing stations by said advancing means, a plurality of egg holding stations onto which said eggs are advanced by said advancing means, said egg holding stations being disposed in alignment with and downstream of said guide means and said egg weighing stations, and lifting means, adapted to engage a plurality of said eggs from the underside thereof and lift said eggs from said holding stations, said lifting means being rotatably and reciprocally movable with respect to said egg holding stations, the rotational movement of said lifting means being about an axis which is generally parallel to the longitudinal axis of said guide means so as to facilitate the engagement and lifting of said eggs by said lifting means during upwardly rotational movement thereof.

2. The apparatus recited in claim 1, wherein said guide means includes at least one first portion which is inclined upwardly in the direction of movement of said eggs on said guide means toward said weighing stations, and at least one second portion which is inclined downwardly in the direction of movement of said eggs on said guide means away from said egg weighing stations toward said egg holding stations.

3. The apparatus recited in claim 2, wherein said upwardly inclined portion of said guide means is disposed at an angle of about 15° with respect to the horizontal, and wherein said downwardly inclined portion of said guide means is disposed at an angle of about 1.6° with respect to the horizontal.

4. The apparatus recited in claim 3, wherein the end of said first portion of said guide means and the beginning of said second portion of said guide means are located ahead of said weighing stations in the direction of movement of said eggs on said guide means.

5. The apparatus recited in claim 4, wherein each of said guide means comprises a pair of spaced-apart vertically disposed planar guide members, the vertically upper edges of said guide members being co-planar and forming said first and second inclined portions of said guide means, said egg holding stations being disposed at one end of said guide members, said guide members further including substantially horizontal leading edges including curved recesses for receiving eggs to be advanced on said guide members to said weighing stations.

6. The apparatus recited in claim 5, wherein said advancing means comprises a plurality of elongated bar means disposed transversely with respect to the longitudinal axis of said guide means, said bar means being adapted for linear movement approximately parallel to said vertically upper edges of said guide members of said guide means.

7. The apparatus recited in claim 6, wherein said advancing means further comprises chain and sprocket means disposed adjacent to said guide means, said bar means being coupled to said chain and sprocket means, and second guide means disposed adjacent to said first guide means and adapted to engage said bar means for guiding said bar means as said bar means are advanced by said chain and sprocket means in a direction generally parallel to said vertically upper edges of said guide members of said guide means.

8. The apparatus recited in claim 1, further comprising second advancing means rotatably movable with respect to said egg holding stations, said second advancing means being adapted to engage eggs on said holding stations from the underside thereof during rotary movement of said second advancing means and to advance eggs from said holding stations to a location longitudinally spaced-apart from and substantially horizontally co-planar with said egg holding stations, the reciprocal movement of said lifting means being generally parallel to the longitudinal axis of said guide means and sufficient to reciprocate said lifting means away from said egg holding stations as said second advancing means moves away from said egg holding stations.

9. The apparatus recited in claim 8, wherein said lifting means comprises, elongated lifting member means including means adapted to engage said eggs at said egg holding stations and at said longitudinally spaced-apart locations on said second advancing means from the underside thereof and lift said eggs therefrom, crank member means coupled to said lifting member means, rotary drive means coupled to said crank member means for rotationally driving said lifting member means with respect to said egg holding stations, the drive axis of said crank member means being offset with respect to said egg holding stations so that said lifting member means is rotationally movable into engagement with eggs disposed at said egg holding stations and said longitudinally spaced-apart locations from the underside thereof to effect lifting of said eggs upwardly and away therefrom, and reciprocating drive means coupled to said lifting member means for reciprocally moving said lifting member means toward and away from said egg holding stations.

10. The apparatus recited in claim 9, wherein said egg grading apparatus includes carriage assembly means adapted to be conveyed in a generally linear direction through a line generally tangent to the path of travel of said lifting member means, said carriage assembly means including oppositely disposed egg-engaging member means pivotally movable with respect to each other so as to engage and close upon eggs disposed on said lifting member means, said egg-engaging member means having downwardly depending curved portions contoured to conform to the shape of said eggs to facilitate a holding engagement therewith, and means coupled to said egg-engaging member means adapted to pivotally close said egg-engaging member means as said carriage assembly passes said lifting member means, thereby transferring said eggs to said carriage assembly means.

11. The apparatus recited in claim 10, wherein said elongated lifting member means includes receiving means adapted to receive a plurality of pairs of said eggs engaged at said egg holding stations and at said longitudinally spaced-apart locations on said second advancing means by said lifting member means, and wherein said carriage assembly means includes a plurality of pairs of egg-engaging member means to facilitate the simultaneous transfer of a plurality of pairs of eggs from said lifting member means to said carriage assembly means.

12. The apparatus recited in claim 1, wherein said egg grading apparatus further comprises conveyor means for conveying eggs through said egg candling station, said guide means being disposed adjacent one end of said conveyor means downstream of said candling station for receiving eggs from said conveyor means.

13. The apparatus recited in claim 1, wherein said first advancing means further comprises rotatable wheel means disposed between said weighing stations and said egg holding stations and including a plurality of egg receiving means for receiving eggs advanced through said weighing stations by said first advancing means, said wheel means rotatably conveying said eggs from said guide means toward said egg holding stations.

14. The apparatus recited in claim 13, wherein said wheel means comprises a pair of rotatable, spaced-apart, parallel disk members adapted for rotational movement toward said egg holding stations, said disk members including a plurality of peripheral recesses, said recesses in said disk members being disposed in horizontal alignment for receiving and holding eggs transferred from said guide means to said egg holding stations by said wheel means.

15. An apparatus for advancing eggs from a candling station through a plurality of weighing stations in an egg grading apparatus, said apparatus including conveying means for conveying eggs through said egg candling station, comprising, elongated guide means for receiving eggs from said candling station and guiding said eggs to said weighing stations of said grading apparatus, said guide means being disposed adjacent one end of said conveyor means downstream of said candling station for receiving eggs from said conveyor means, said guide means further including at least one first portion which is inclined upwardly in the direction of movement of said eggs on said guide means toward said weighing stations, and at least one second portion which is inclined downwardly in the direction of movement of said eggs on said guide means away from said egg weighing stations, the end of said first portion of said guide means and the beginning of said second portion of said guide means being located ahead of said weighing stations in the direction of movement of said eggs on said guide means, said second portion having an angle of inclination with respect to the horizontal which is less than that of said first upwardly inclined portion, first advancing means, disposed vertically above said guide means and adjacent thereto, adapted to individually engage and advance said eggs along said guide means to said weighing stations, said weighing stations being disposed along said guide means so that eggs are advanced over said weighing stations by said advancing means, a plurality of egg holding stations onto which said eggs are advanced by said advancing means, said holding stations being disposed in alignment with and downstream of said guide means and said egg weighing stations, and lifting means, adapted to engage a plurality of said eggs from the underside thereof and lift said eggs from said holding stations, said lifting means being rotatably and reciprocally movable with respect to said egg holding stations, the rotational movement of said lifting means being about an axis which is generally parallel to the longitudinal axis of said guide means so as to facilitate the engagement and lifting of said eggs by said lifting means during upwardly rotational movement thereof.

16. The apparatus recited in claim 15, wherein said upwardly inclined first portion of said guide means is disposed at an angle of about 15° with respect to the horizontal, and wherein said downwardly inclined second portion of said guide means is disposed at an angle of about 1.6° with respect to the horizontal.

17. The apparatus recited in claim 15, wherein each of said guide means comprises a pair of spaced-apart, vertically disposed planar guide members, the vertically upper edges of said guide members being co-planar and forming said first and second inclined portions of said guide means, said egg holding stations being disposed at one end of said guide members, said guide members further including substantially horizontal leading edges including curved recesses for receiving eggs to be advanced on said guide members to said weighing stations.

18. The apparatus recited in claim 17, wherein said advancing means comprises a plurality of elongated bar means disposed transversely with respect to the longitudinal axis of said guide means, said bar means being adapted for linear movement approximately parallel to at least a portion of said guide means.

19. The apparatus recited in claim 18, wherein said advancing means further comprises chain and sprocket means disposed adjacent to said guide means, said bar means being coupled to said chain and sprocket means, and second guide means disposed adjacent to said first guide means and adapted to engage said bar means for guiding said bar means as said bar means are advanced by said chain and sprocket means in a direction generally parallel to said vertically upper edges of said guide members of said guide means.

20. The apparatus recited in claim 15, further comprising second advancing means rotatably movable with respect to said egg holding stations, said second advancing means being adapted to engage eggs on said holding stations from the underside thereof during rotary movement of said second advancing means and to advance eggs from said holding stations to a location longitudinally spaced-apart from and substantially horizontally co-planar with said egg holding stations, the reciprocal movement of said lifting means being generally parallel to the longitudinal axis of said guide means and sufficient to reciprocate said lifting means away from said egg holding stations as said second advancing means moves away from said egg holding stations.

21. The apparatus recited in claim 20, wherein said lifting means comprises, elongated lifting member means including means adapted to engage said eggs at said egg holding stations and at said longitudinally spaced-apart locations on said second advancing means from the underside thereof and lift said eggs therefrom, crank member means coupled to said lifting member means, rotary drive means coupled to said crank member means for rotationally driving said lifting member means with respect to said egg holding stations, the drive axis of said crank member means being offset with respect to said egg holding stations so that said lifting member means is rotationally movable into engagement with eggs disposed at said egg holding stations and said longitudinally spaced-apart locations from the underside thereof to effect lifting of said eggs upwardly and away therefrom, and reciprocating drive means coupled to said lifting member means for reciprocally moving said lifting member means toward and away from said egg holding stations.

22. The apparatus recited in claim 15, wherein said first advancing means further comprises rotatable wheel means disposed between said weighing stations and said egg holding stations and including a plurality of egg receiving means for receiving eggs advanced through said weighing stations by said first advancing means, said wheel means rotatably conveying said eggs from said guide means toward said egg holding stations.

23. The apparatus recited in claim 22, wherein said wheel means comprises a pair of rotatable, spaced-apart, parallel disk members adapted for rotational movement toward said egg holding stations, said disk members including a plurality of peripheral recesses, said recesses in said disk members being disposed in horizontal alignment for receiving and holding eggs transferred from said guide means to said egg holding stations by said wheel means.

24. A method for advancing a plurality of rows of eggs from a candling station through a plurality of weighing stations in an egg grading apparatus, comprising, conveying eggs from said candling station to elongated guide means disposed adjacent to said candling station, continuously advancing said eggs on said guide means through said weighing stations, simultaneously with said step of advancing, weighing said eggs at said weighing stations, guiding said eggs from said weighing stations first to a plurality of egg holding stations located downstream of said guide means and then to a plurality of locations longitudinally spaced-apart from and substantially horizontally co-planar with said holding stations, guiding further eggs to said plurality of holding stations, and lifting said eggs simultaneously from said holding stations and said plurality of longitudinally spaced-apart locations.

25. The method recited in claim 24, wherein said step of advancing comprises advancing said eggs on said guide means upwardly in the direction of movement of said eggs toward said weighing stations at an angle of about 15° with respect to the horizontal.

26. The method recited in claim 25, wherein said step of advancing further comprises advancing said eggs on said guide means upwardly toward said weighing stations at said angle of about 15° with respect to the horizontal to locations adjacent and ahead of said weighing stations in the direction of movement of said eggs on said guide means.

27. The method recited in claim 26, wherein said step of guiding further comprises guiding said eggs downwardly away from said locations through said weighing stations toward said egg holding stations at an angle of about 1.6° with respect to the horizontal.

28. An apparatus for advancing eggs from a candling station through a plurality of weighing stations in an egg grading apparatus, comprising, first elongated guide means for receiving eggs from said candling station and guiding said eggs to the weighing stations of said grading apparatus, first advancing means, disposed vertically above said guide means and adjacent thereto, adapted to individually engage and advance said eggs along said guide means to said weighing stations, said weighing stations being disposed along said guide means so that eggs are advanced over said weighing stations by said advancing means, a plurality of egg holding stations onto which said eggs are advanced by said advancing means, said egg holding stations being disposed in alignment with and downstream of said guide means and said egg weighing stations, and second advancing means rotatably and reciprocally movable with respect to said egg holding stations, said second advancing means being adapted to engage eggs on said holding stations from the underside thereof during rotary movement of said second advancing means and to advance eggs from said holding stations to a location longitudinally spaced-apart from and substantially horizontally co-planar with said egg holding stations.

29. The apparatus recited in claim 28, further comprising lifting means, adapted to engage a plurality of said eggs from the underside thereof and lift said eggs from said holding stations and from said longitudinally spaced-apart locations on said second advancing means, said lifting means being rotatably and reciprocally movable with respect to said egg holding stations, the rotational movement of said lifting means being about an axis which is generally parallel to the longitudinal axis of said guide means so as to facilitate the engagement and lifting of said eggs by said lifting means during upwardly rotational movement thereof, the reciprocal movement of said lifting means being generally parallel to the longitudinal axis of said guide means and sufficient to reciprocate said lifting means away from said egg holding stations as said second advancing means moves away from said egg holding stations.

30. The apparatus recited in claim 29, wherein said lifting means comprises, elongated lifting member means including means adapted to engage said eggs at said egg holding stations and at said longitudinally spaced-apart locations on said second advancing means from the underside thereof and lift said eggs therefrom, crank member means coupled to said lifting member means, rotary drive means coupled to said crank member means for rotationally driving said lifting member means with respect to said egg holding stations, the drive axis of said crank member means being offset with respect to said egg holding stations so that said lifting member means is rotationally movable into engagement with eggs disposed at said egg holding stations and said longitudinally spaced-apart locations from the underside thereof to effect lifting of said eggs upwardly and away therefrom, and reciprocating drive means coupled to said lifting member means for reciprocally moving said lifting member means toward and away from said egg holding stations.

31. The apparatus recited in claim 30, wherein said egg grading apparatus includes carriage assembly means adapted to be conveyed in a generally linear direction through a line generally tangent to the path of travel of said lifting member means, said carriage assembly means including oppositely disposed egg-engaging member means pivotally movable with respect to each other so as to engage and close upon eggs disposed on said lifting member means, said egg-engaging member means having downwardly depending curved portions contoured to conform to the shape of said eggs to facilitate a holding engagement therewith, and means coupled to said egg-engaging member means adapted to pivotally close said egg engaging member means as said carriage assembly passes said lifting member means, thereby transferring said eggs to said carriage assembly means.

32. The apparatus recited in claim 31, wherein said elongated lifting member means includes receiving means adapted to receive a plurality of pairs of said eggs engaged at said egg holding stations and at said longitudinally spaced-apart locations on said second advancing means by said lifting member means, and wherein said carriage assembly means includes a plurality of pairs of egg-engaging member means to facilitate the simultaneous transfer of a plurality of pairs of eggs from said lifting member means to said carriage assembly means.

33. The apparatus recited in claim 28, wherein said guide means includes at least one first portion which is inclined upwardly in the direction of movement of said eggs on said guide means toward said weighing stations, and at least one second portion which is inclined downwardly in the direction of movement of said eggs on said guide means away from said egg weighing stations toward said egg holding stations.

34. The apparatus recited in claim 33, wherein said upwardly inclined portion of said guide means is disposed at an angle of about 15° with respect to the horizontal, and wherein said downwardly inclined portion of said guide means is disposed at an angle of about 1.6° with respect to the horizontal.

35. The apparatus recited in claim 34, wherein the end of said first portion of said guide means and the beginning of said second portion of said guide means are located ahead of said weighing stations in the direction of movement of said eggs on said guide means.

36. The apparatus recited in claim 35, wherein each of said guide means comprises a pair of spaced-apart, vertically disposed planar guide members, the vertically upper edges of said guide members being co-planar and forming said first and second inclined portions of said guide means, said egg holding stations being disposed at one end of said guide members, said guide members further including substantially horizontal leading edges including curved recesses for receiving eggs to be advanced on said guide members to said weighing stations.

37. The apparatus recited in claim 36, wherein said first advancing means comprises a plurality of elongated bar means disposed transversely with respect to the longitudinal axis of said guide means, said bar means being adapted for linear movement approximately parallel to said vertically upper edges of said guide members of said guide means.

38. The apparatus recited in claim 37, wherein said first advancing means further comprises chain and sprocket means disposed adjacent to said guide means, said bar means being coupled to said chain and sprocket means, and second guide means disposed adjacent to said first guide means and adapted to engage said bar means for guiding said bar means as said bar means are advanced by said chain and sprocket means in a direction generally parallel to said vertically upper edges of said guide members of said guide means.

39. The apparatus recited in claim 28, wherein said egg grading apparatus further comprises conveyor means for conveying eggs through said egg candling station, said guide means being disposed adjacent one end of said conveyor means downstream of said candling station for receiving eggs from said conveyor means.

40. The apparatus recited in claim 28, wherein said first advancing means further comprises rotatable wheel means disposed between said weighing stations and said egg holding stations and including a plurality of egg receiving means for receiving eggs advanced through said weighing stations by said first advancing means, said wheel means rotatably conveying said eggs from said guide means toward said egg holding stations.

41. The apparatus recited in claim 40, wherein said wheel means comprises a pair of rotatable, spaced-apart, parallel disk members adapted for rotational movement toward said egg holding stations, said disk members including a plurality of peripheral recesses, said recesses in said disk members being disposed in horizontal alignment for receiving and holding eggs transferred from said guide means to said egg holding stations by said wheel means.

* * * * *